Figure 1:
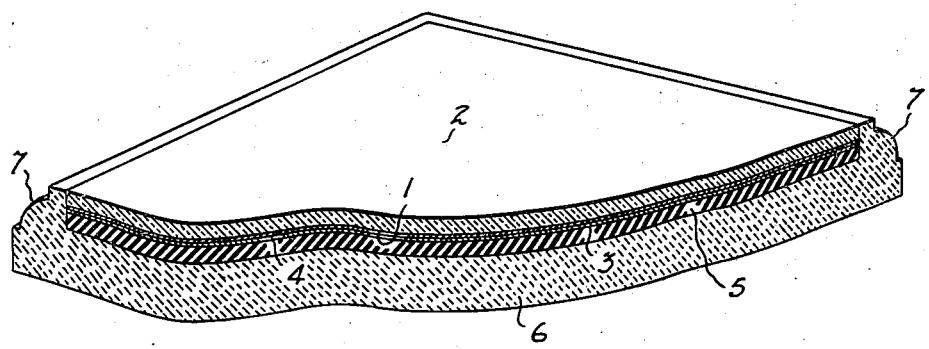

March 10, 1942.  M. SKOLNIK  2,276,108
DECORATED GLASS ARTICLE AND METHOD OF MAKING THE SAME Filed Aug. 27, 1940

INVENTOR
*Max Skolnik*
BY
*Evans + McCoy*
ATTORNEYS

Patented Mar. 10, 1942

2,276,108

UNITED STATES PATENT OFFICE 2,276,108

DECORATED GLASS ARTICLE AND METHOD OF MAKING THE SAME

Max Skolnik, Chicago, Ill.

Application August 27, 1940, Serial No. 354,408

10 Claims. (Cl. 41—22)

This invention relates to composite articles having glass reinforced with a hard backing member and to a method of making the same. It particularly relates to articles such as table tops, wall tile, mirrors, etc. with decorated transparent or translucent glass protected by a suitable reinforcing member.

It has been proposed to make tile and similar materials by coating glass with suitable decorative films applied either directly or by the decalcomania process and adhering the coated glass to a hard cement surface through a suitable mastic material, the glass being disposed with the uncoated surface outward so that it protects the decorative paint film from wear and exposure.

The cheapest and most satisfactory of the available mastics are the bituminous base materials, such as asphalts. Such materials are sufficiently plastic to permit relative movement due to the thermal expansion of the glass or the cement. Unfortunately, however, these materials have extremely great migratory powers and will bleed through paints and coatings forming dirty brown blotches. Certain of them even operate to discolor or destroy silvered surfaces. In fact, the penetrating powers of asphalts are so great that the usual materials, such as paints, varnishes, shellac, resins, glues, etc., used for sealing surfaces do not afford a solution to the problem and it has been considered necessary to dispose a continuous layer of metal foil, such as aluminum foil, between the decorative surface and the bituminous material. Metal foil is undesirable because it is expensive, difficult to apply, and requires the use of additional coatings of adhesives.

It is an object of this invention to produce inexpensive articles having glass covered with a decorative coating reinforced with a layer of strong magnesium oxychloride cement which is attached to the coated surface through an intermediate layer of asphalt, which articles are weather resistant and have the decorative coating adequately protected from discoloration by the asphalt.

It is another object of this invention to provide table tops, tile and the like, having glass coated with a suitable decorative coating such as is applied by the decalcomania or transfer process bonded to a magnesium oxychloride cement backing through a layer of bituminous material.

When such articles are prepared by uniting a solid sheet backing member to glass through a layer of bitumen having substantial thickness it is extremely difficult to obtain uniform thickness in the composite articles and adhesion over the entire surface of the glass.

It is therefore, a further object of this invention to provide a method of making decorative glass articles having uniform thicknesses and having glass reinforced by a suitable layer of magnesium oxychloride cement, wherein the cement applied in the plastic condition and is bonded to the glass through a cushioning layer of suitable material.

Figure 2:
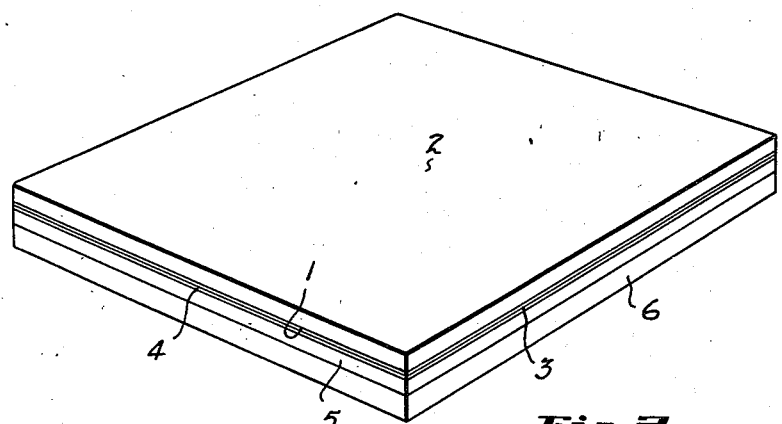
Figure 3:
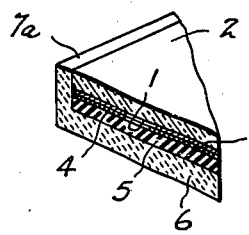

Other objects will be apparent from the following description of the invention as is illustrated by the accompanying drawing in which:

Figure 1 is a perspective view with parts broken away of an article such as a table top with an integral molding and backing as prepared in accordance with this invention; Fig. 2 is a perspective view of a tile or mirror prepared in accordance with the present invention and Fig. 3 is a perspective view with parts broken away of an article such as a mirror prepared in accordance with the present invention, and having an edge which is integral with the backing member.

According to the present invention, a coating of metal flake in a suitable vehicle is disposed between the decorative coating on the glass and the mastic, which is preferably a bitumen, such as asphalt. I have found that a film deposited from a suitable vehicle containing a substantial proportion of metal flake will entirely prevent the discoloration of paint films by asphalt and that a continuous metal foil is not required.

In the preparation of the articles of this invention, a surface 1 of the glass facing member 2, which may be thinner than plate glass, is covered with a decorative coating 3, which may be enamel, lacquer, silver, etc., and which may either be applied directly or by the transfer or decalcomania process. A coating 4 of aluminum paint or other coating containing metal flake dispersed in a suitable vehicle is disposed over the decorative coating and allowed to dry thoroughly. In the case of a mirror, a coating of a paint or lacquer is preferably disposed directly over the silver on the surface of the glass before the coating containing the aluminum flake is applied. After the coating 4 of aluminum flake has dried, a layer of flat paint is preferably superimposed thereon, in order to further insure non-penetration of asphalt to the decorative surface. A cushioning layer 5 of melted asphalt or similar bitumen is then spread over the coated surface as uniformly as is practicable, and the magnesium oxychloride cement, prepared in the customary manner by forming a creamy mixture of magnesium oxide, a solution of magnesium chloride, and silica, is then spread on the asphalt coating, allowed to harden and form the backing member 6 of the desired thickness. It has been found that a superior backing is produced if a sizing coat of the hard-setting cement be brushed onto the asphalt with a relatively stiff brush before applying the major portion of the cement thereon. Such brushing action prevents bubbles and air holes from occurring in the backing. The backing may extend around the edges of the glass facing member 2 to form the molding 7.

By applying the cement backing in paste form, the thickness of the backing may be varied to compensate for variations which are present in the surface of the asphalt cushioning layer and articles of uniform thickness are readily produced. I have found that, although the asphalt has hardened, a strong bond to the backing is obtained if the backing is applied as an aqueous paste. The heat produced by the exothermal reaction which occurs during the setting of the magnesium cement paste softens the asphalt and vaporizes the moisture, which normally tends to prevent adhesion, so that a firm union is obtained between the constituents of the article.

Aluminum is preferably the flaky metal in the protective coating 4 because the ratio of width to thickness of aluminum flake is large, but other flaky materials, such as bronze flakes, etc., and even mica, may be used as an effective barrier. The metal flake should be present in substantial proportion and should be suspended in a paint, or varnish, vehicle which contains a substantial proportion of a synthetic resin, preferably of the alkyd, vinyl, or phenol-formaldehyde types. In the dried film the flakes are disposed in shingle formation, thereby preventing the migration of asphalt into the decorative film 3.

Bituminous materials are preferred as the meltable mastic 5, because they adhere strongly to the coated or uncoated glass and to the cement backing and, while having the general characteristics of a solid, they will yield sufficiently under stress to compensate for relative thermal expansions or contractions of the glass and backing. The softening point of the bitumen should be higher than the temperature which may be encountered in use, and a liquefying point of at least 200° F. is usually desirable. The bituminous coating may be as little as 1/32" in thickness, but a coating 1/8" or so in thickness is preferred, to provide the desired flexibility.

In order that the magnesium cement backing have high strength it is desirable that up to 10% or so of fibrous material be incorporated into the mix. The ingredients including magnesium oxide, fine silica and fibers are first mixed together in powder form and then stirred with sufficient 20° to 25° Beaumé magnesium chloride solution, which may contain any desired pigments, to make a mix of creamy consistency. The mix is allowed to remain in the mixer until the exothermal reaction progresses to the stage where it starts to set before it is applied to the asphalt coated glass, whereupon it sets within an hour or two.

A particularly strong backing for table tops, tile and the like is obtained by mixing about 2 parts of magnesium oxide, about 2.5 to 3.5 parts of finely ground silica, and 5 to 10 parts of wood fiber with a 20° to 25° Beaumé magnesium chloride solution. The material is allowed to remain in the mixer until it begins to set and is then applied to the asphalt coated glass. If a table top illustrated by Fig. 1 is desired, the moldings 7 are molded integral with the backing. If a tile or mirror illustrated by Fig. 2 or 3 is desired, a protective molding 7a may be formed integral with the backing or the edges may be trimmed flush with the glass before the cement has hardened.

While magnesium oxychloride cement is usually preferable for the backing member of articles made according to the invention disclosed herein, it is to be understood that other hydraulic cements, which are sufficiently strong to serve as a backing member and sufficiently exothermic to soften the mastic and cause relatively good adhesion between the mastic and the cement, may be utilized.

While the present invention is particularly applicable to articles having a glass surface, it is understood that the glass may be substituted by wood, pressed or molded material such as "formica" sheets, laminated phenolic resinous sheets, stainless steel, etc., to produce table tops and the like having desirable appearance and strength.

It will be seen that the backings applied as above permit one to obtain the advantages incident to a plate glass while making use of thinner and less expensive types. The article has the additional advantages of being shatter proof and of not having the glassy sound and ring of ordinary glass. A frame is unnecessary since the backing may be ground flush with the edges of the article or a molding may be prepared integral therewith. The articles may be placed in moist or damp places and in surroundings having extreme temperature changes without deterioration.

It is to be understood that variations and modifications of the specific devices herein shown and described for purposes of illustration, may be made without departing from the spirit of the invention.

What I claim is:

1. A strongly bonded article of manufacture comprising a glass facing member, a decorative coating on a surface of said facing member, a backing member of magnesium oxychloride cement, a cushioning layer of solid bituminous material between said backing member and said decorative coating bonding said decoratively coated surface to said backing member, and a protective coating containing a substantial proportion of metal flake disposed between said bituminous material and said decorative coating, whereby migration of said bituminous material into contact with said decorative coating is prevented.

2. A table top comprising a glass facing member with a decorative coating on one of its surfaces, a backing member of magnesium oxychloride cement bonded to said coated surface through a layer of bituminous material, a coating containing metal flake disposed between said decorated surface, and said bituminous material, and a molding integral with said backing and surrounding the edges of said glass facing member.

3. A tile comprising a glass facing member with a decorative coating on one of its surfaces, a backing member of magnesium oxychloride cement bonded to said coated surface through a layer of bituminous material and a coating containing metal flake disposed between said decorated surface and said bituminous material.

4. A table top comprising a glass facing member with a decorative coating on one of its surfaces, a backing member of magnesium oxychloride cement bonded to said coated surface through a layer of bituminous material, a coating containing aluminum flake disposed between said decorated surface, and said bituminous material, and a molding integral with said backing and surrounding the edges of said glass facing member.

5. In a method of making articles having a glass facing member with a decorated surface bonded to a magnesium oxychloride cement, the steps which comprise disposing of a layer of melted bituminous material over the coated surface of said facing member, spreading a layer of an aqueous magnesium oxychloride paste in contact with said bituminous material, and allowing said paste to set in contact with said solid bituminous material, whereby said bituminous material is softened by heat incident to the exothermal reaction during the setting of said paste and forms a strong bond.

6. In the method of making articles having a glass facing member with a decorated surface bonded to a magnesium oxychloride cement, the steps which comprise disposing a coating containing metal flake over the coated surface of said facing member, disposing a layer of bituminous material over said metal coating, spreading a layer of an aqueous magnesium oxychloride paste in contact with said bituminous material, and allowing said paste to set in contact with said solid bituminous material, whereby said bituminous material is softened by heat incident to the exothermal reaction in said paste and forms a strong bond to said hardened paste.

7. A strongly bonded article of manufacture comprising a glass facing member, a decorative coating on a surface of said facing member, a backing member of magnesium oxychloride cement and a cushioning layer of solid bituminous material between said backing member and said decorative coating bonding said decoratively coated surface to said backing member, said backing member having variations in thickness which correspond to variations in the surface of said bituminous material as when said backing member is applied in paste form to said solid bituminous material, the surface pores of said backing member in contact with said bituminous material being wetted with said bituminous material as when said bituminous material has been softened after the solidification of said backing member.

8. In the method of making articles having a glass facing member with a decorated surface bonded to a magnesium oxychloride cement, the steps which comprise disposing a coating containing metal flake over the coated surface of said facing member, disposing a layer of bituminous material over said metal coating, spreading a layer of cement paste which sets with relatively rapid evolution of heat in contact with said bituminous material, whereby said bituminous material is softened by heat incident to the exothermal reaction in said paste and forms a strong bond to said hardened paste.

9. A strongly bonded article of manufacture comprising a facing member having a decorative surface, a backing member of magnesium oxychloride cement and a cushioning layer of solid bituminous material between said backing member and said facing member bonding said facing member to said backing member, said bituminous layer having variations in thickness, said backing member having variations in thickness and having surface cavities and variations which interlock with said bituminous material and which correspond to and compensate for variations in the thickness of said bituminous material so that the article has substantially uniform thickness, the surface pores of said backing member in contact with said bituminous material being wetted with said bituminous material as when said bituminous material has been softened after the solidification of said backing member.

10. In a method of making articles having a facing member bonded to a magnesium oxychloride cement backing, the steps which comprise disposing a layer of bituminous material over a surface of said facing member, spreading a sizing coating of magnesium oxychloride cement paste over the surface of said bituminous material, working said sizing into intimate contact with said bituminous material, applying a heavy backing layer of magnesium oxychloride cement over said sizing coating, and allowing the magnesium oxychloride paste to set in contact with said bituminous material, whereby said bituminous material is softened by heat incident to the exothermal reaction in said paste and forms a strong bond to said hardened paste.

MAX SKOLNIK.